United States Patent [19]

Billard et al.

[11] Patent Number: 4,517,896

[45] Date of Patent: May 21, 1985

[54] ELECTROMAGNETIC DECOY LAUNCHING DEVICE, IN PARTICULAR FOR AN AIRCRAFT

[75] Inventors: Alain A. Billard, Muret; André R. Santalucia, Leguevin, both of France

[73] Assignee: Etienne LaCroix - Tous Artifices, Muret, France

[21] Appl. No.: 383,772

[22] Filed: Jun. 1, 1982

[30] Foreign Application Priority Data

Jun. 3, 1981 [FR] France ................. 81 10977

[51] Int. Cl.³ .......................... F42B 13/50; F41F 5/02
[52] U.S. Cl. ...................................... 102/342; 89/1.57
[58] Field of Search ................ 89/1.5 R, 1.5 C, 1.5 F; 102/342, 345, 351, 352, 357, 360, 394, 505; 244/137 R; 343/18 E; 60/636, 632; 220/316, 260, 261, 355

[56] References Cited

U.S. PATENT DOCUMENTS

| | | | |
|---|---|---|---|
| 2,859,896 | 11/1958 | Johnson | 221/253 |
| 3,430,533 | 3/1969 | Kifor et al. | 102/505 |
| 3,511,457 | 5/1970 | Pogue | 89/1.5 R |
| 3,808,940 | 5/1974 | Schillreff et al. | 89/1.5 R |
| 3,899,975 | 8/1975 | Lawrence | 343/18 E |
| 3,964,393 | 6/1976 | Foote et al. | 102/342 |
| 4,129,078 | 12/1978 | Schneider et al. | 102/89 |
| 4,374,494 | 2/1983 | Maury | 102/505 |

FOREIGN PATENT DOCUMENTS 2172519 9/1973 France .
1588114 4/1981 United Kingdom ............ 89/1.5 F

OTHER PUBLICATIONS

Revue Internationale De Defense, "Equipements de guerre électronique montés sur avions", 1976, p. 192.

Primary Examiner—Richard E. Schafer
Assistant Examiner—D. Cornwell
Attorney, Agent, or Firm—McCormick, Paulding & Huber

[57] ABSTRACT

In an ejection cavity defined by walls such as (753 and 754), an open decoy support body (70) in the form of a slide is placed, and equipped with a pyrotechnic ejection charge (709) and a transmitter (761) for igniting the ejection charge on command. In addition to the stopper (755) which closes the ejection orifice of the cavity, a retaining member (750) is provided, comprising along its edge V-shaped clips (751), whereof the point is directed towards the inside of the decoy launching cavity and keeps the decoys in place despite the high accelerations and vibrating stresses encountered in an aircraft. At the time of deployment of the decoy, the sliding of the slide will disengage the V-shaped clips (751), which allows a slow departure of the decoy support member.

9 Claims, 7 Drawing Figures

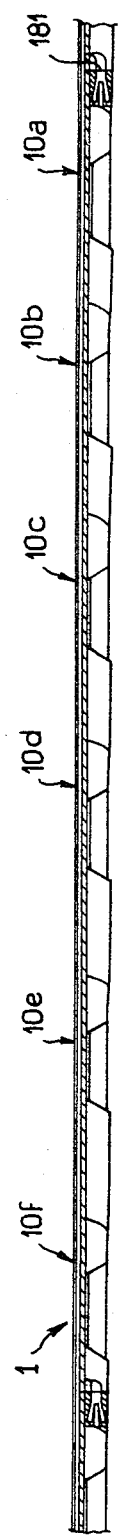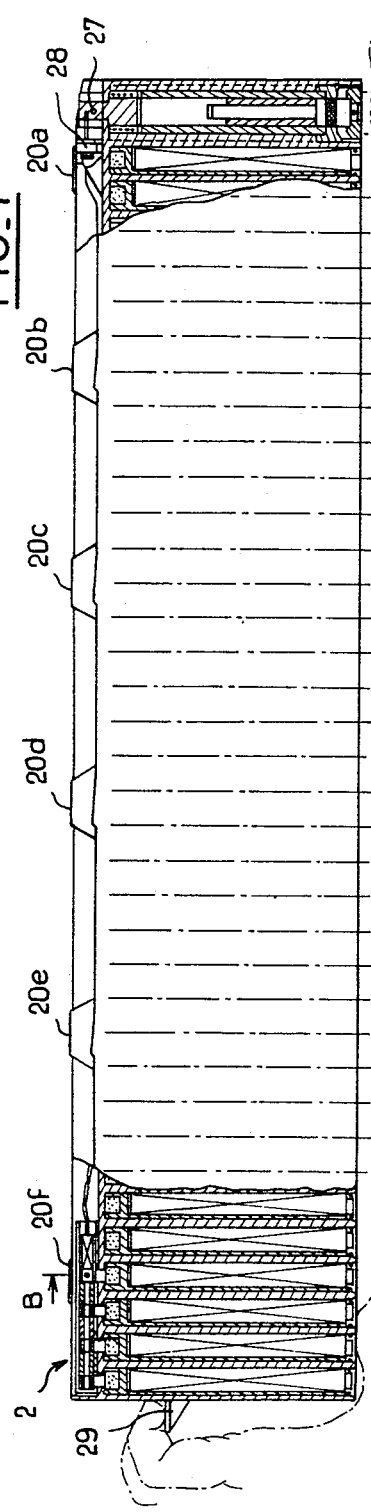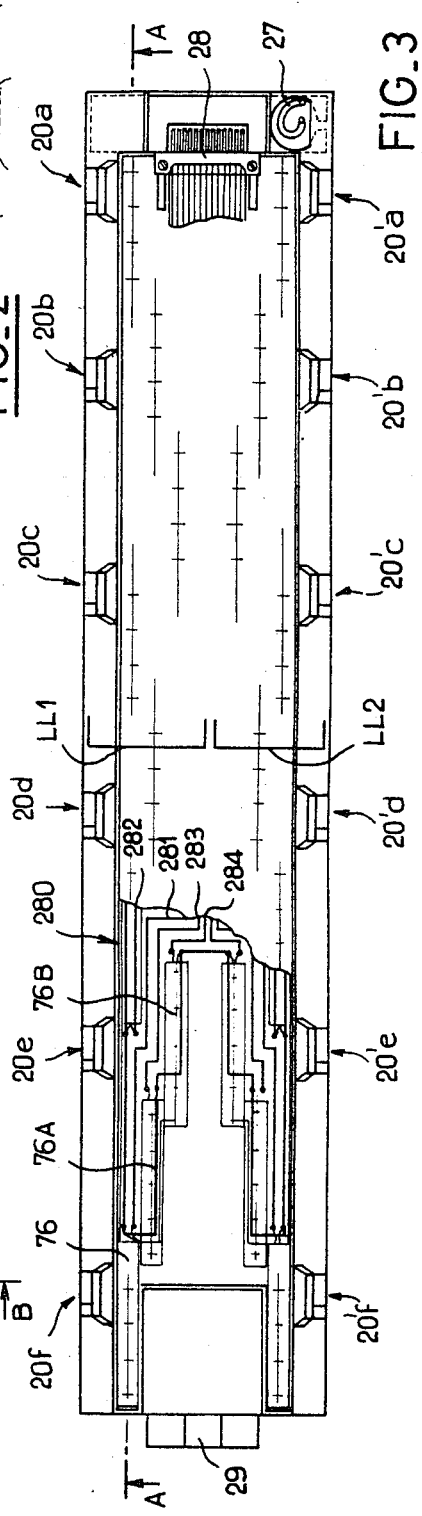

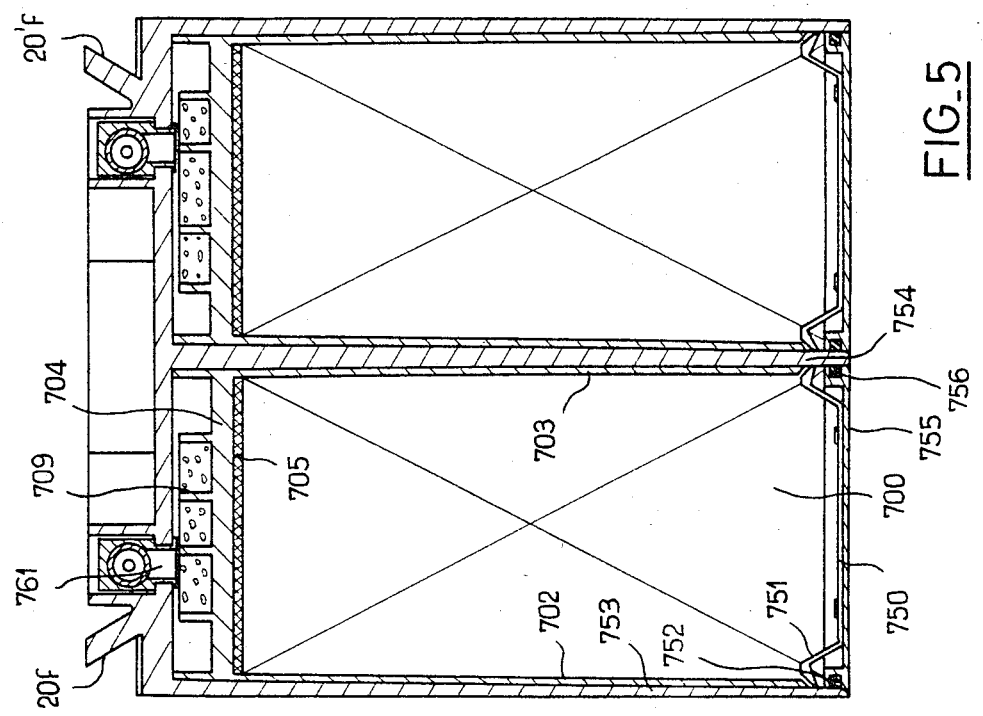
FIG_5
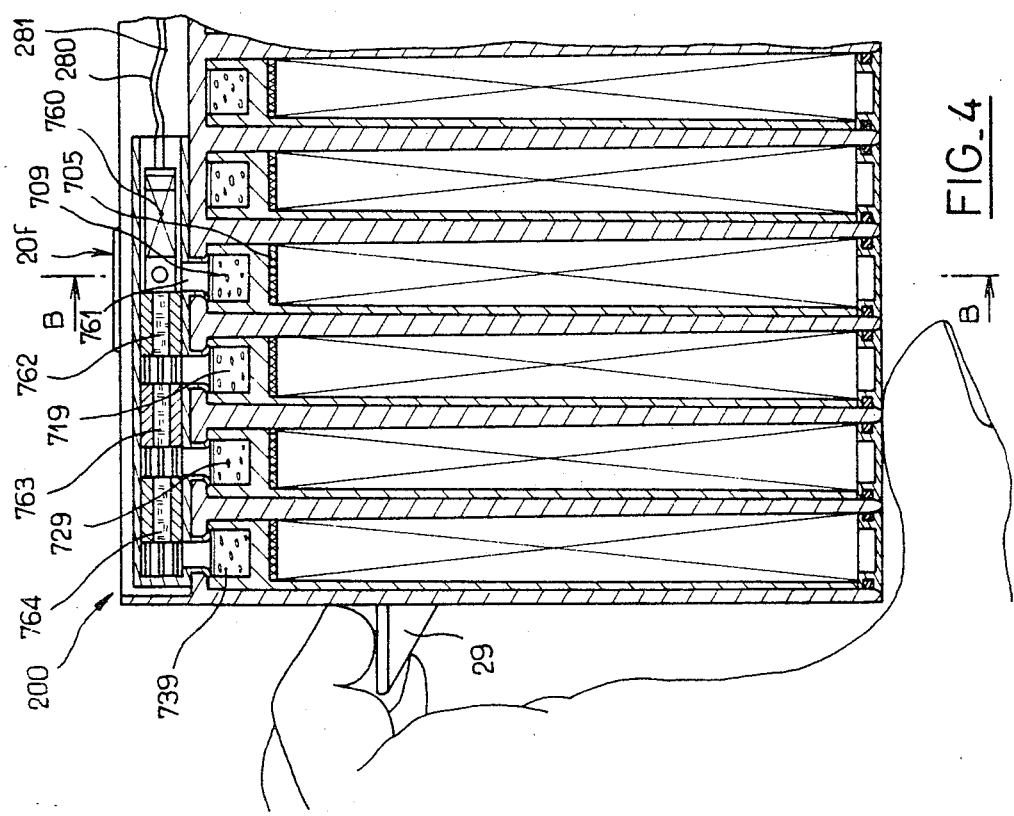
FIG_4

ELECTROMAGNETIC DECOY LAUNCHING DEVICE, IN PARTICULAR FOR AN AIRCRAFT

The present invention relates to the use of electromagnetic decoys. It relates more particularly to the protection of aircraft from radar-guided missiles, or "self-guidance systems using radar", and from radar-guided firing.

In order to obtain effective radar protection, it is necessary to take the three following criteria into account:

speed of expansion of the cloud of decoys, equivalent radar surface level obtained, duration of ejection of the basic decoys (one cartridge for example).

The self-guidance systems of missiles are being improved: their "resolution cell" is becoming increasingly smaller; their system of tracking the target aircraft is increasingly insensitive to the apparent increase in speed or acceleration created due to the ejection of decoys from the aircraft; finally, the tracking system may under certain conditions anticipate and predict the trajectory of the aircraft for several instants, thus "passing over" the electromagnetic decoys.

It is thus desirable to make the use of electromagnetic decoys as effective as possible, with respect to the trajectory of the aircraft: the Applicant has observed that a slow progressive rise of the equivalent radar surface level is necessary (in order to be as effective as possible at the level of high speed tracking of the self-guidance system), accompanied by a sudden end intended to promote the interruption of tracking.

The problem is that the shape of the cloud naturally obtained with a conventional cartridge for launching electromagnetic decoys is the reverse of the desired shape.

The present invention intends to provide a much more satisfactory solution.

The proposed launching device for electromagnetic decoys is of the type comprising an ejection cavity, an open decoy support member housed in the ejection cavity and equipped with a pyrotechnic ejection charge and means, incorporated in the cavity, for igniting the ejection charge on command, whereas a plug closes off the ejection orifice of the cavity.

According to a first feature of the invention, a retaining member having a unidirectional effect is provided, beside the plug and inside the cavity, which member grips onto the wall of the cavity, the gripping action disappearing solely under the thrust of the decoy support member at the time of ejection, which allows a slow departure of the decoy support member, whilst also ensuring, before deployment of the decoys, excellent resistance to mechanical stresses such as those existing on board an aircraft, without necessitating the use of larger pyrotechnic charges for interrupting the retaining effect, which inevitably leads to higher speeds.

Advantageously, the retaining member is provided along the edge with V-shaped clips, whereof the point is directed towards the inside of the decoy launching cavity. These clips may be continuous or virtually continuous.

One thus solves the problem of using decoys in the immediate vicinity of the aircraft, without encountering the difficulties inherent in the use of slow pyrotechnic charges. The "instantaneous recoil" at the time of ejection is also appreciably reduced, this recoil causing drawbacks such as compression of the decoy charge, causing criss-crossing which prejudices their satisfactory deployment.

Preferably, the decoy support member and the ejection cavity are of rectangular cross-section, in which case the decoys are housed crosswise along the major side of the cross-section. In particular this allows easier cutting of the decoys (small metallized plates or in certain cases ribbons) in order to cover several wavelength bands, optionally adjustable according to the radar frequency emitted by the missile.

Another aspect of the problem is to increase the speed of dispersion of the small plates appreciably, in order that they are distributed in the immediate vicinity of the aircraft.

According to another aspect of the invention, the decoy support member is a slide open on one major side and at its end adjacent the plug, the other major side being provided with calibrated orifices, which allows transverse low speed deployment of the decoys. On account of the air turbulence linked with the departure of the slide, which turbulence follows the aircraft, the decoys will also tend to follow the aircraft.

Very advantageously, the decoy launching device comprises several ejection cavities enclosing several respective decoy charges and the means for igniting the ejection charges act sequentially, with staggered delays, on the various decoy charges.

In one embodiment, four charges can be excited sequentially at a single command.

In practice, the delays between charges are of the order of time taken for the deployment of decoys of a basic charge.

Preferably, the delays between charges will decrease progressively from the first ejection to the last.

For use on aircraft, the various ejection cavities are incorporated crosswise in an elongated decoy launching module, so that the major base of the slides is ejected adjacent the front of the aircraft.

In a preferred embodiment, the decoy launching module comprises a flat bottom wall, provided with male engagement members able to cooperate with female engagement members of a support rod fixed to the aircraft, with engagement of a connector between the module and the support rod. Each series of ejection cavities is interconnected by a succession of pyrotechnic delay members arranged axially in the module, in the vicinity of its bottom wall and controlled by a respective electrical initiator connected to the connector.

Other features and advantages of the invention will become apparent on reading the ensuing detailed description, made with reference to the accompanying drawings, given to illustrate a preferred embodiment of the invention in a nonlimiting manner and in which:

FIG. 1 is a sectional view of a support rod intended to be fixed to an aircraft in order to receive an electromagnetic decoy launching module according to the preferred embodiment of the invention;

FIG. 2 is a sectional view of the preferred embodiment of the electromagnetic decoy launching module;

FIG. 3 is a plan view of the module of FIG. 2 and comprises the section line A—A along which the section of FIG. 2 is taken;

FIG. 4 is an enlarged view of the left-hand part of FIG. 2;

FIG. 5 is a sectional view on section line B—B of FIGS. 2 and 4;

Figure 7:
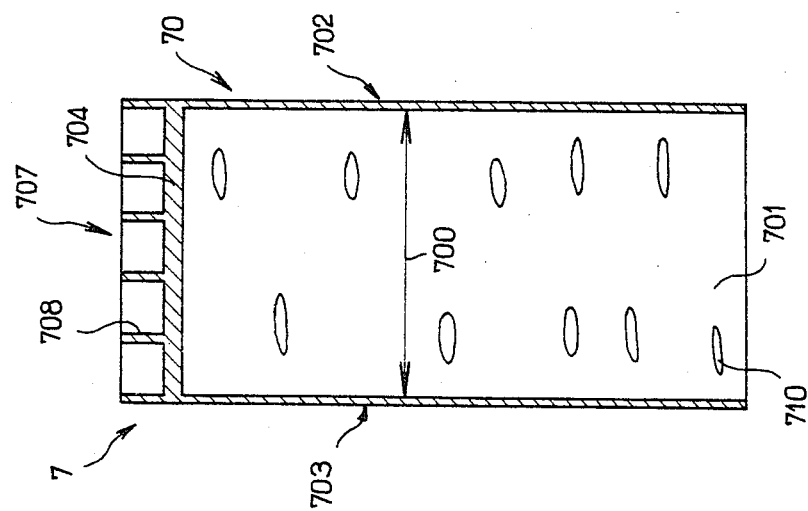
FIG. 6 is a perspective view illustrating the slide incorporated in a decoy launching member according to the invention and FIG. 7 is a front view of the same slide.

In FIG. 1, the support rod incorporated in the aircraft is designated by the reference numeral 1. It comprises female engagement members identified by the reference numerals 10a to 10f. Other details of these engagement members will become apparent from U.S. patent application Ser. No. 384,097 filed on June 1, 1982 in the name of the applicant and corresponding to copending application entitled "Securing apparatus for modules carried on aircraft, in particular for flare launching modules". The reference numeral 181 designates the inlet of an electrical connector coming from a central control device located on the aircraft.

In FIG. 2, the general reference 2 designates a electromagnetic decoy launching module. On its generally flat base 200, this module comprises male engagement members 20a to 20f, which in this case are constructed in the manner of dovetails, in the same way as the counterpart members 10a to 10f of FIG. 1. A gripping handle 29 is also shown as well as a device 27 which is able to ensure relative translation between the support rod 1 and the module 2, in order to ensure locking of the male and female members by their dovetails. Finally, an electrical connector 28 is shown incorporated in the decoy launching module in its upper part and able to cooperate with the connector element 181 of the support rod. Other descriptive portions relating to the general structure of this module may be found in the abovementioned patent application, of which the contents are to be incorporated in the present document.

Reference will now be made essentially to FIGS. 2 to 7. The sectional view of FIG. 2 shows that thirty six basic decoy launching devices are located over the length, certain of them being illustrated in section and others represented by a vertical axis line. As shown by the diagrammatic lines LL1 and LL2 of FIG. 3, and by the sectional view of FIG. 5, two decoy launching members are arranged side by side crosswise inside the module 2, which thus comprises seventy two basic decoy launchers in all.

Figure 6:
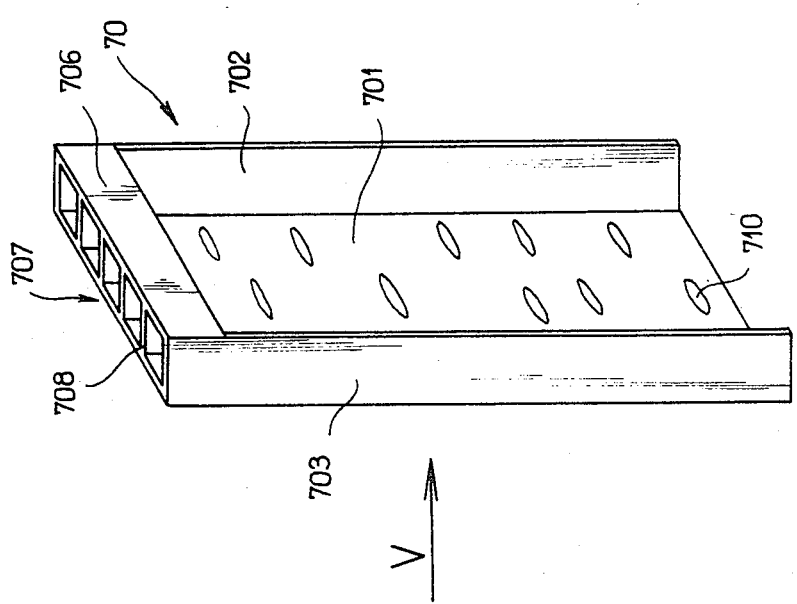

FIGS. 5 to 7 show that each decoy launcher member comprises an ejection cavity, defined by walls of the module, namely the side wall 753, the central wall 754, other partitions arranged transversely in the other direction as well as the bottom wall 704. Located inside the ejection cavity defined in this way is an open decoy support member 70, illustrated without the decoys in FIGS. 6 and 7. The decoy support member 70 is in the form of a slide, provided with two side walls 702 and 703 and a bottom 701, the opposite, top side being open, in the same way as the lower orifice in FIG. 6 and FIG. 7. The diagrammatic line 700 of FIG. 7 illustrates that within the individual decoys, small metallized plates or even metallized ribbons are arranged crosswise along the major side of the rectangular cross-section defined inside the slide 70. The major side 701 of the slide is provided with calibrated orifices 710, which allow deployment of the decoys by using the air turbulence linked with the departure of the slide, as will be seen hereafter.

Naturally, the ejection cavity defined inside the launcher module 2 has a rectangular cross-section which is the counterpart of the cross-section of the decoy support slide, in order to receive the slide so that it is able to slide with a close fit.

This ejection cavity is provided in FIG. 5 with a plug 755, which is equipped in the conventional manner with a peripheral seal 756 constituted by an O-ring. Fixed to this plug 755, for example by crimping, is a retaining member 750 having a unidirectional effect, which grips onto the wall of the tube 753, as well as onto the wall 754 and the other walls in the direction parallel to the plane of FIG. 5.

In the embodiment illustrated, the retaining member 750 is defined by a flat part, provided along the edge with clips of general V shape, these clips bearing the reference numerals 751. The point of the V is directed towards the inside of the decoy launching cavity, which means that the free side of the V, directed towards the outside and preferably reinforced, will be wedged against the side wall of the launcher tube, in order to oppose violently any pulling force towards the outside of the arrangement of the slide on account of vibrations and other movements inherent in the aircraft, which would produce components of force on the entire decoy support member. In this way one may thus produce a structure which under traction, in the vicinity of the plate 750, withstands an acceleration of the order of 15 times the acceleration of gravity.

One problem occurred according to the prior art, since with such a retaining force and on account of the requirements of deployment of the decoys, it would have been necessary to provide a pyrotechnic ejection charge which is both slow and powerful, which is virtually impossible to achieve.

With the arrangement according to the invention, the walls 702,703 of the decoy support slide 70 act upon the sloped outer edge of the V clip 751, so that the grip of the clip on the ejection tube is released when the clip is acted upon by the translational movement of the slide under the effect of the ejection charge 709, whereas the decoys themselves do not yet push on the plug 755 and the plate 750. This allows a slow departure of the decoy support member 70, by means of an ejection charge 709 of low power, in order to reduce the instantaneous recoil effects linked with the use of this pyrotechnic charge.

On account of this slow departure, only a low relative speed is imparted to the decoys with respect to the aircraft, in the transverse direction. Moreover, it is the base 701 provided with orifices 710 which is directed towards the front of the aircraft. Therefore the decoys will be dropped only slowly, on account of the turbulence occurring behind the base 701 on account of the departure of the slide 70. Also, this turbulence will allow the decoys to remain in the vicinity of the aircraft, even after having left the mechanical arrangement integral with the craft, hence also producing a low relative speed of the decoys with respect to the aircraft in the longitudinal direction of movement of the craft.

It will also be noted that the geometry of the proposed decoy support slide makes it possible to deploy a considerable quantity of decoys on each occasion and consequently to use a considerable equivalent radar surface, which as has been mentioned, will develop in the immediate vicinity of the aircraft, in practice following the movement of the craft. As shown in FIG. 4, the decoy launching module comprises several ejection tubes enclosing several respective decoy charges. The ignition means for the ejection charges will act sequentially, with staggered delays, on the various decoy charges.

More precisely, an electrical initiator 760 is connected by conducting wires 280 and 281 coming from the connector 28. (Other wires 282, 283 and 284 act with respect to the same earth wire 280, but on other groups of decoy charges).

By means of the transmitter 761, the electrical initiator 760 will immediately ignite the ejection charge 709 of a first basic decoy, which will spread out in the manner which has been described. After a predetermined delay, defined by the delay member 762, a similar transmission of fire will excite the ejection charge 719 of an adjacent body of basic decoys, which is in turn spread out. As a general rule, the delay is chosen to be of the order of time taken for the deployment of the decoys of a basic charge, in order that the second decoy charge is deployed shortly after the time when the first decoy charge is deployed, in order to reinforce the action of the the first, as will be seen hereafter.

Then, a second pyrotechnic delay member 763 will actuate a third ejection charge 729, which will in turn produce the spreading-out of a new body of basic decoys. Finally, a last pyrotechnic delay member 764 will excite the fourth ejection charge 739, which produces the departure of a fourth body of basic decoys.

In this embodiment it will be seen that four basic decoy charges can be excited sequentially at a single command, acting on a single electric initiator.

In the preferred application, the values of the delays defined by the members 762 to 764 between the various charges will decrease progressively from the first charge ejected to the last. FIG. 4 also shows that the succession of excitation means constituted by the initiator 760 and the delay members 762 to 764 is arranged axially, along the major dimension of the decoy launcher module 2. In FIG. 3, this arrangement 760 to 764 is represented by the rectangle 76. This figure also shows that other pyrotechnic excitation means such as 76A are arranged axially, which are associated with a group of four basic decoys implanted in position axially adjacent to the first four. FIG. 3 also shows the "staircase" arrangement of three ignition devices 76, 76A and 76B respectively associated with three groups of four basic decoys. The stairs overlap, allowing the passage of the electrical connections to the connector 28 and the entire arrangement is symmetrical about the longitudinal axis of the decoy launcher module 2. Naturally, the points of cooperation between each of these excitation devices incorporated in the launcher module and the respectively associated ejection charges will be staggered according to the position of the basic charge of decoys in question along the axis of the launcher module.

In this respect, it will be seen from FIGS. 6 and 7 that the upper part of the slide 70 is provided with a rectangular cavity 707, defined, in addition to the other walls of the slide, by a front wall member 706. Provided in this cavity are intermediate partitions such as 708, which define the various possible chambers for the ejection charge, with respect to the various ejection speeds retained.

The advantages of the present invention will become apparent on comparing the results which it provides with those of conventional decoy launching cartridges.

It will be recalled that conventional decoy launching cartridges produce a considerable localized deployment of decoys in an area of small dimensions (about 10 meters), followed by a slow progressive dispersion which is hardly favorable for seduction all the more since the shape of the radar signature decreases as one moves away from the aircraft (smaller equivalent radar surface adjacent the aircraft).

From the time of the departure of the slide and on account of the turbulence which it causes, a dispersion spread out over a wide area in space (several hundreds of meters) associated with a shape of cloud adapted for seduction produces a slow progressive rise of the equivalent radar surface level, accompanied by a sudden end which promotes the interruption of tracking. This shape is obtained by the sequential firing of several charges for which the ejection speeds are higher and higher (the first ejection speeds being expressed in meters per second, the last in tens of meters per second). Firing of this type may use several series of four bodies of decoys, ejected intermitently.

Naturally, the present invention is not limited to the embodiment described and extends to any variation within its scope.

We claim:

1. An electromagnetic decoy launching device, of the type comprising an ejection cavity with an ejection opening at one side, a decoy support member housed in the ejection cavity for ejection from the cavity in a direction extending through the ejection opening, and provided with a low pyrotechnic ejection charge and means connected with the cavity for igniting the ejecting charge on command, the decoy support member and the ejection cavity being of rectangular cross-section, the decoys being housed in the cavity crosswise to the ejection direction, and a retaining member between the decoy support member and ejection cavity with releasable V-shaped clips pointed toward the inside surface of the cavity and establishing with the cavity a gripping engagement, the V-shaped clips themselves being released from engagement with the cavity by translational movement of the support member toward the ejection opening by the pyrotechnic ejection charge in order to allow a slow departure of the decoy support member, whilst also ensuring, before ejection of the decoys, resistance to vibratory stresses such as those existing on board an aircraft.

2. A device according to claim 1, further including a closing plug sealing the ejection opening of the cavity and ejected with the decoy support member.

3. A device according to claim 1, wherein the decoy support member is a slide open on one major side and on its end adjacent the ejection open, the other major side being provided with calibrated orifices, which allows transverse progressive deployment of the decoys at low speed, using the air turbulence connected with the departure of the slide.

4. A device according to one of claims 1, 2 or 3, wherein a series of ejection cavities enclose several respective decoy charges and the means for igniting ejection charges acts sequentially, with staggered delays, on decoy charges in the series.

5. A device according to claim 4, wherein four charges can be excited sequentially at a single command.

6. A device according to claim 4, wherein the delays between charges are of the order of time taken for the deployment of one of the decoys by the pyrotechnic.

7. A device according to claim 4, wherein the delays between charges decrease progressively from the first ejection to the last ejection.

8. A device according to claim 4 wherein the various ejection cavities are incorporated crosswise in an elongated decoy launching module with a major side of the support member adjacent the front of the aircraft.

9. A device according to claim 8, wherein the decoy launching module comprises a generally flat bottom wall provided with male engagement members able to cooperate with female engagement members of a support rod fixed to the aircraft and with an electrical connection for electrically connecting the module to the aircraft at the support rod, and each of a series of ejection cavities is connected to a series of pyrotechnic delay members arranged in the module, in the vicinity of its bottom wall and controlled by a respective electric initiator connected to the connector.

* * * * *